United States Patent
Maguin et al.

(10) Patent No.: US 9,562,457 B2
(45) Date of Patent: Feb. 7, 2017

(54) DEVICE FOR DELIVERING A LIQUID ADDITIVE AND MOTOR VEHICLE HAVING THE DEVICE

(71) Applicant: EMITEC GESELLSCHAFT FUER EMISSIONSTECHNOLOGIE MBH, Lohmar (DE)

(72) Inventors: Georges Maguin, Marly (FR); Cheikh Diouf, Silly-sur Nied (FR); Finn Frederiksen, Hals (DK); Sven Schepers, Troisdorf (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/640,221

(22) Filed: Mar. 6, 2015

(65) Prior Publication Data
US 2015/0176452 A1 Jun. 25, 2015

Related U.S. Application Data

(63) Continuation of application No. PCT/EP2013/067126, filed on Aug. 16, 2013.

(30) Foreign Application Priority Data

Sep. 6, 2012 (DE) .......................... 10 2012 108 272

(51) Int. Cl.
*F01N 3/00* (2006.01)
*F01N 3/20* (2006.01)
(Continued)

(52) U.S. Cl.
CPC ............. *F01N 3/20* (2013.01); *B01D 53/9431* (2013.01); *F01N 3/2066* (2013.01); *F01N 13/18* (2013.01);
(Continued)

(58) Field of Classification Search
USPC .................. 60/274, 286, 295, 297, 301, 303
See application file for complete search history.

(56) References Cited

U.S. PATENT DOCUMENTS

| 6,082,102 A | 7/2000 | Wissler et al. | |
| 7,017,335 B2 * | 3/2006 | Huber | B01D 53/9431 60/274 |

(Continued)

FOREIGN PATENT DOCUMENTS

| DE | 19743337 C1 | 1/1999 |
| DE | 102006061736 A1 | 7/2008 |

(Continued)

*Primary Examiner* — Binh Q Tran
(74) *Attorney, Agent, or Firm* — Laurence A. Greenberg; Werner H. Stemer; Ralph E. Locher

(57) ABSTRACT

A device for delivering a liquid additive includes an additive delivery unit and an electronic unit. The additive delivery unit has at least one hydraulic component for delivering the liquid additive. All electrical connections of the at least one hydraulic component are brought together in a first plug connector on the additive delivery unit. The electronic unit has a second plug connector which can be connected to the first plug connector. The first plug connector and the second plug connector are connected to one another and form a plug connection when the electronic unit and the additive delivery unit are connected to one another. A motor vehicle having the device is also provided.

9 Claims, 4 Drawing Sheets

(51) Int. Cl.
*F01N 13/18* (2010.01)
*B01D 53/94* (2006.01)

(52) U.S. Cl.
CPC .... *F01N 2450/00* (2013.01); *F01N 2610/1406* (2013.01); *F01N 2610/1433* (2013.01); *F02D 2400/22* (2013.01); *Y02T 10/24* (2013.01); *Y10T 137/9029* (2015.04)

(56) References Cited

U.S. PATENT DOCUMENTS

| | | | |
|---|---|---|---|
| 7,937,934 B2 | 5/2011 | Plougmann | |
| 8,096,112 B2* | 1/2012 | Dalton | F01N 3/2066 137/341 |
| 8,132,405 B2* | 3/2012 | Katou | B01D 53/9409 60/295 |
| 8,161,735 B2* | 4/2012 | Kitazawa | F01N 3/2066 60/295 |
| 8,201,393 B2* | 6/2012 | Zapf | F01N 3/2066 60/286 |
| 8,359,833 B2* | 1/2013 | Nalla | F01N 3/103 60/274 |
| 8,464,966 B2 | 6/2013 | Haeberer et al. | |
| 2012/0225396 A1 | 9/2012 | Harr et al. | |
| 2013/0280958 A1 | 10/2013 | Landes et al. | |
| 2013/0313137 A1 | 11/2013 | Madoux et al. | |
| 2014/0065022 A1 | 3/2014 | Overhoff et al. | |

FOREIGN PATENT DOCUMENTS

| | | |
|---|---|---|
| DE | 102009041938 A1 | 3/2011 |
| DE | 102010062985 A1 | 4/2012 |
| DE | 102011014634 A1 | 9/2012 |
| EP | 1435458 A1 | 7/2004 |
| FR | 2939481 A1 | 6/2010 |
| FR | 2967723 A1 | 5/2012 |

* cited by examiner

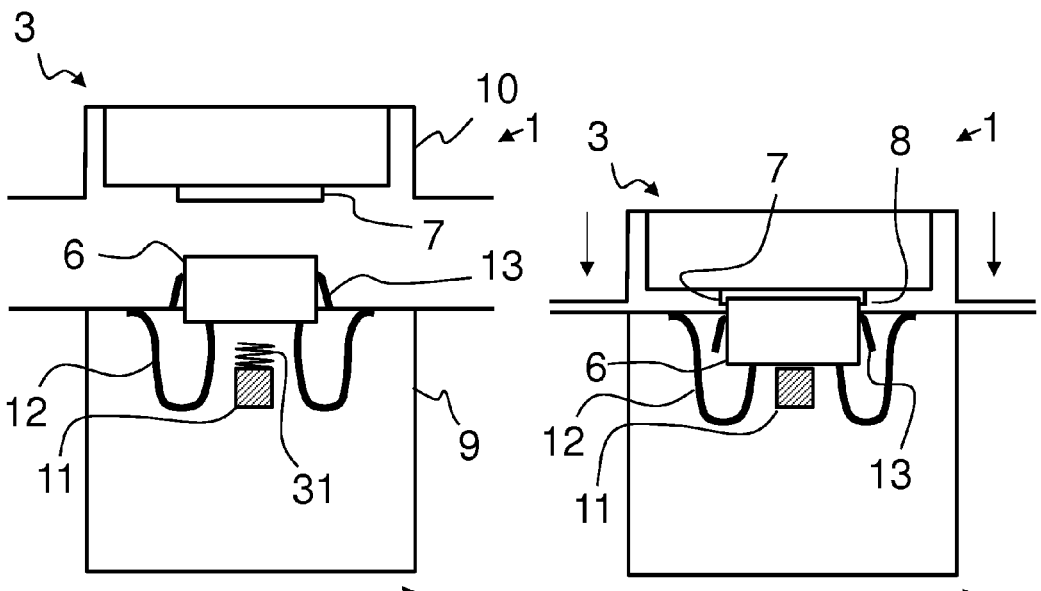
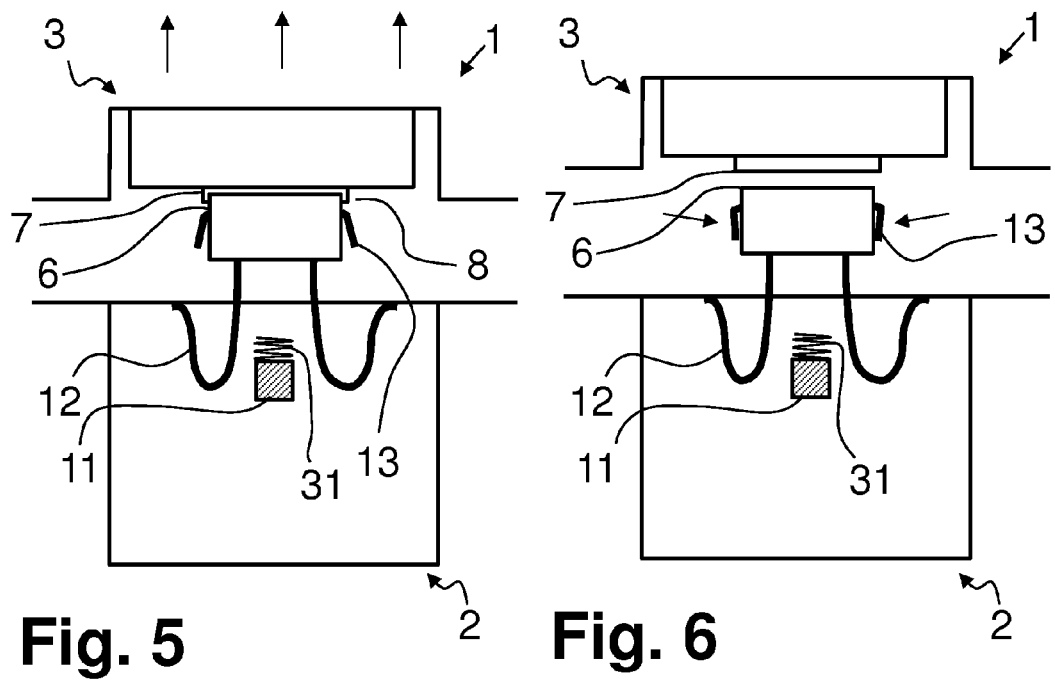

DEVICE FOR DELIVERING A LIQUID ADDITIVE AND MOTOR VEHICLE HAVING THE DEVICE

CROSS-REFERENCE TO RELATED APPLICATION

This is a continuation, under 35 U.S.C. §120, of copending International Application No. PCT/EP2013/067126, filed Aug. 16, 2013, which designated the United States; this application also claims the priority, under 35 U.S.C. §119, of German Patent Application DE 10 2012 108 272.3, filed Sep. 6, 2012; the prior applications are herewith incorporated by reference in their entirety.

BACKGROUND OF THE INVENTION

Field of the Invention

The present invention relates to a device for delivering and dosing a liquid additive. Such a device may be used, for example, in a motor vehicle to feed a liquid additive to an exhaust-gas treatment device of the motor vehicle. The invention also relates to a motor vehicle having the device.

In motor vehicles with diesel internal combustion engines, exhaust-gas treatment devices are used into which a liquid additive is fed. The liquid additive then serves, for example, to reduce nitrogen oxide compounds in the exhaust gas of the internal combustion engine. This takes place with the aid of the method of selective catalytic reduction (SCR method). In the SCR method, a urea-water solution is typically used as a liquid additive and the urea-water solution is converted in the exhaust gas to form ammonia. The conversion of nitrogen oxide compounds in the exhaust gas into non-harmful substances such as water ($H_2O$), nitrogen ($N_2$) and/or carbon dioxide ($CO_2$) then takes place with the aid of the ammonia. At present, a 32.5% (by weight) urea-water solution which is available under the trademark AdBlue® has become established as a liquid additive. A liquid additive used for the purpose of exhaust-gas purification is often also referred to as a reducing agent or a reducing agent precursor.

A device for delivering and dosing a liquid additive for a motor vehicle should as far as possible function in the manner of an (autonomous) black box system. A black box system means a system to which a dosing demand for dosing the liquid additive is transmitted, and which thereupon delivers a liquid additive quantity corresponding to the dosing demand from a tank. In order to satisfy the demand, it is advantageous for electronic components to be provided within the device, which electronic components correspondingly process the dosing demand in order to control, operate, etc. the components of the dosing device accordingly. For example, the information regarding a demanded quantity of liquid additive may be converted into a control variable for the operation of a delivery pump in the device.

Furthermore, a device for delivering a liquid additive should be manufactured with low costs and be as easy as possible to maintain.

SUMMARY OF THE INVENTION

It is accordingly an object of the invention to provide a device for delivering a liquid additive and a motor vehicle having the device, which overcome the hereinafore-mentioned disadvantages and solve the highlighted technical problems of the heretofore-known devices and vehicles of this general type. It is sought, in particular, to propose an especially inexpensive device for delivering a liquid additive having electronic components for controlling the delivery of the liquid additive, in which the device is simplified in relation to known systems, in particular, with regard to assembly and maintenance.

With the foregoing and other objects in view there is provided, in accordance with the invention, a device for delivering a liquid additive, comprising an additive delivery unit and an electronic unit, wherein the additive delivery unit has at least one hydraulic component for delivering the liquid additive, all of the electrical connections of the at least one hydraulic component are brought together in a first plug connector on the additive delivery unit, and the electronic unit has a second plug connector which can be connected to the first plug connector. The first plug connector and the second plug connector are connected to one another and form a plug connection when the electronic unit and the additive delivery unit are connected to one another.

The device is preferably subdivided (in the manner of a set) in such a way that all of the (active) components which serve for the delivery of the liquid additive and/or which are in contact with the liquid additive are disposed in/on the additive delivery unit. The components, which are referred to herein as hydraulic components, are for example a pump which performs the delivery of the liquid additive, valves which control the flow direction of the liquid additive through the ducts of the device, and sensors through the use of which the liquid additive is monitored and which are accordingly in contact with the liquid additive. If a plurality of such hydraulic components is provided, all of the connections of the hydraulic components are brought together in the first plug connector. The first plug connector thus constitutes a collective connection through which all of the hydraulic components of the device can be contacted. The additive delivery unit is thus, in particular, a preassembled, separate structural unit which can be mounted, for example, (independently) in/on a bracket on the motor vehicle or tank.

The electronic unit is, in particular, a pre-assembled, separate structural unit which can be mounted, for example, (independently) in/on a bracket on the motor vehicle or tank or the additive delivery unit. The electronic unit has a second plug connector which can be connected to the first plug connector in order to effect the electrical contacting of the hydraulic components of the device. The plug connection formed from the first plug connector and the second plug connector is jointly formed during the assembly step of the connection of the additive delivery unit to the electronic unit, that is to say, in particular, directly upon the joining of the two units together. For this purpose, the first plug connector and the second plug connector are disposed in such a way that, during the assembly of the additive delivery unit onto the electronic unit, the first plug connector and the second plug connector automatically correspondingly come into contact with one another in such a way that the plug connection is formed.

The construction of the additive delivery unit and of the electronic unit of the device makes it possible for the additive delivery unit and the electronic unit to initially be assembled independently of one another and combined to form the device in a single subsequent assembly step. As a result of the described advantageous construction of the first plug connector and of the second plug connector, the final assembly step requires particularly little outlay.

Preferably, the first plug connector of the electronic unit is mounted at the electronic unit in such a manner that it cannot move relative to the electronic unit. In particular, the first plug connector does not yield if the second plug connector is pushed against it for forming the plug connection. In contrast to this, the second plug connector of the additive delivery unit is preferably movable relative to the additive delivery unit and it moves upon forming the plug connection. The movability of the second plug connector enables adjusting manufacturing tolerances.

Furthermore, it is made possible for different additive delivery units and different electronic units to be combined with one another for different requirements. It is, for example, possible for different additive delivery units to be constructed for different delivery rates. It is, for example, possible for different additive delivery units with different pump capacities to be provided, which different additive delivery units can all be combined with a common electronic unit. This reduces the number of different units and components which are required and which must be stocked in order to be able to provide different devices for delivering a liquid additive.

It is also possible for different electronic units to be provided for a certain additive delivery unit, which electronic units can be adapted, for example, in each case to the electronics of different motor vehicle types (for example of different motor vehicle manufacturers). This also reduces the number of different units and components which are required in order to be able to provide different devices for delivering a liquid additive.

The additive delivery unit and the electronic unit may include guiding devices, which support a correct positioning of both units to each other during assembly. The guiding devices may be formed by openings or bores of the additive delivery unit and corresponding pins of the electronic unit or vice versa. In this regard the pins are formed to engage into the openings or bores so that both units are guided on each other during assembly.

In accordance with another particularly advantageous feature of the device of the invention, the additive delivery unit has a pot-shaped housing and the electronic unit has a cover for the pot-shaped housing, and the pot-shaped housing is closed by the cover when the electronic unit and the additive delivery unit are connected to one another.

The cover preferably has a depression and/or a cavity where the electronic components of the electronic unit are disposed. The construction of the device with a cover and with a pot-shaped housing makes it possible for both the components within the additive delivery unit and also the components within the electronic unit to be freely accessible before the assembly of the device, that is to say before the connection of the electronic unit and additive delivery unit. The connection or assembly of the additive delivery unit and electronic unit causes the device to be closed off (preferably in a fluid-tight manner—with the exception of the desired inflow and outflow ducts). This reduces the total outlay required for the assembly of the device. A very high level of ease of maintenance of the device is ensured at the same time, because the components within the device are directly accessible when the electronic unit and the additive delivery unit are separated from one another again (physically and electrically).

The housing of the additive delivery unit is preferably disposed at least partially in the interior of a tank for the liquid additive. The housing extends preferably from a tank wall of the tank into a tank interior which is filled with liquid additive and an opening of the housing points towards an outer side of the tank wall. The opening can be closed off by the cover of the electronic unit.

In accordance with a further advantageous feature of the device of the invention, the pot-shaped housing is part of a tank wall of a tank for the liquid additive.

A tank for the liquid additive is preferably a plastic tank which may be produced, for example, by using an injection molding process. It is particularly advantageous for the housing to be part of the tank wall of the tank. The tank wall of the tank may, for example, have, in sections, an inwardly protruding portion into the tank interior, which inwardly protruding portion is accessible from an outer side of the tank. The hydraulic components for delivering the liquid additive may be disposed in the inwardly protruding portion. The inwardly protruding portion, viewed on its own, is preferably of pot-shaped form. A pot-shaped form of the inwardly protruding portion means, in particular, that (if the rest of the tank wall around the inwardly protruding portion is removed), the inwardly protruding portion is in the shape of a pot.

Since the housing of the additive delivery unit is a constituent part of a tank wall of a tank for the liquid additive, it is possible for the housing of the additive delivery unit to be produced in a particularly inexpensive and simple manner. Good leak tightness of the tank is obtained at the same time because no fluid-tight connection need be produced between the housing and the tank wall.

In accordance with an added advantageous feature of the device of the invention, at least the first plug connector or the second plug connector bears against a stop when the electronic unit and the additive delivery unit are connected to one another, and wherein during the connection, the first plug connector and the second plug connector are pressed into one another by using the stop.

The stop supports the first plug connector and/or the second plug connector, in such a way that the first plug connector and the second plug connector are pressed into one another in order to form the plug connection. The stop may have a spring element which, during the connection process, presses against the first plug connector and/or against the second plug connector and in so doing exerts a defined force which ensures a secure connection of the plug connectors.

It is particularly advantageous for the spring element to be a plastically deformable spring element which undergoes a plastic deformation during the connection of the first plug connector and of the second plug connector. It can be ensured in this way that the first plug connector and the second plug connector are pressed into one another with a precisely defined force. The precisely defined force is predefined exactly by the elastic recovery of the spring element after the plastic deformation. This is also the case if production tolerances with regard to the spacing between the first plug connector and the second plug connector have not been exactly adhered to, because the elastic recovery of a plastically deformed spring element is, at least in regions, independent of the plastic deformation of the spring element which has previously taken place.

In accordance with an additional advantageous feature of the device of the invention, at least the first plug connector or the second plug connector has a movable electrical connection line, in such a way that the first plug connector and/or the second plug connector remains connected when the electronic unit and the additive delivery unit are released from one another.

The connection line itself is preferably not elastic but rather in the form of at least one loop, in order to ensure that the first plug connector or the second plug connector can be released from the respective other unit. The first plug connector and the second plug connector preferably bear only loosely against the respective unit. When the plug connection is formed, a mechanical force holds the plug connection together. By using such a construction, it is possible for the additive delivery unit and electronic unit to be released from one another, for example, for servicing purposes.

In accordance with yet another advantageous feature of the device of the invention, at least the first plug connector or the second plug connector has a fastener which can be activated in order to release the plug connection. The fastener includes, for example, at least one lever element which can be actuated in such a way that the first plug connector and the second plug connector are (automatically) lifted from each other (during the release of the structural units from one another). The fastener is preferably disposed in such a way that it is accessible when the electronic unit and the additive delivery unit are released from one another.

Preferably, the first plug connector and the second plug connector are connected by using the plug connection in such a manner that vibrations cannot cause relative movement of the first plug connector and the second plug connector to each other. This can be achieved by a connection of the plug connectors, at which the engaging elements of the plug connectors are connected with a clamping force. Such a clamping force can also be generated by a form-locking connection of the plug connectors.

By using such a fastener, it is possible for the additive delivery unit and the electronic unit to be fully separated from one another. In this case, full separation also means, in particular, that the electrical connection of the two units is also severed. This also permits, for example, the exchange of the electronic unit or of the additive delivery unit.

In accordance with yet a further advantageous feature of the device of the invention, a supply connection for the liquid additive extends through the electronic unit proceeding from the additive delivery unit.

For this purpose, the electronic unit may have an opening or a passage through which the supply connection extends. The supply connection is preferably a connector to which a line for conducting the liquid additive from the device to a feed device (nozzle, injector, etc.) can be connected. It is particularly advantageous for the supply connection to extend through the electronic unit because the electronic unit is preferably disposed on the outer side of a tank for the liquid additive. The additive delivery unit is thus disposed in the tank for the liquid additive or between the tank for the liquid additive and the electronic unit. The electronic unit thus covers the additive delivery unit toward the outer side. It is therefore particularly advantageous for an opening or a passage to be provided in the electronic unit for the supply connection, through which opening or passage the supply connection extends when the electronic unit and the additive delivery unit are connected to one another. There is, however, nevertheless preferably no contact between the liquid additive and the electronic unit. The supply connection through the electronic unit is preferably a line portion, which is closed off in a fluid-tight manner with respect to the electronic unit.

In accordance with yet an added advantageous feature of the device of the invention, a prevention device is provided at least on the additive delivery unit or on the electronic unit. The prevention device prevents the electronic unit and the additive delivery unit from being able to be connected to one another when the plug connection is not formed by the first plug connector and the second plug connector.

With such a prevention device, it can be achieved that the plug connection is formed whenever the electronic unit and the additive delivery unit are connected to one another. In particular, the additive delivery unit and the electronic unit are prevented from being able to be connected to one another if a correctly formed electrical plug connection is not created at the same time. Such a prevention device may, for example, be in the form of a lever element which folds over when the plug connection is formed and thereby releases a blocking device which prevented assembly of the additive delivery unit and of the electronic unit before the plug connection was correctly formed.

With the objects of the invention in view, there is concomitantly provided a motor vehicle, comprising an internal combustion engine, an exhaust-gas treatment device for the purification of the exhaust gases of the internal combustion engine, a tank for a liquid additive, and a device as described herein for delivering liquid additive from the tank into the exhaust-gas treatment device. In the exhaust-gas treatment device there is preferably provided an SCR catalytic converter through the use of which the method of selective catalytic reduction is carried out in order to purify the exhaust gases of the internal combustion engine. The liquid additive is preferably a reducing agent, and particularly preferably a urea-water solution. The liquid additive is fed to the exhaust-gas treatment device by the described device through a feed device. The feed device is connected to the device for delivering the liquid additive through a line for conducting the liquid additive. The feed device preferably includes a nozzle for atomizing the liquid additive in the exhaust-gas treatment device. The feed device preferably also includes an injector for dosing the liquid additive.

Other features which are considered as characteristic for the invention are set forth in the appended claims, noting that the features specified individually in the claims may be combined with one another in any desired technologically meaningful way and may be supplemented by features and explanatory facts from the description, with further embodiments of the invention being specified.

Although the invention is illustrated and described herein as embodied in a device for delivering a liquid additive and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a fragmentary view of a first embodiment of a device as described herein before assembly;

FIG. 4 is a fragmentary view of the device of FIG. 3 after assembly;

FIG. 5 is a fragmentary view of the device of FIG. 3 after a first disassembly step;

FIG. 6 is a fragmentary view of the device of FIG. 3 after a second disassembly step;

DETAILED DESCRIPTION OF THE INVENTION

Figure 1:
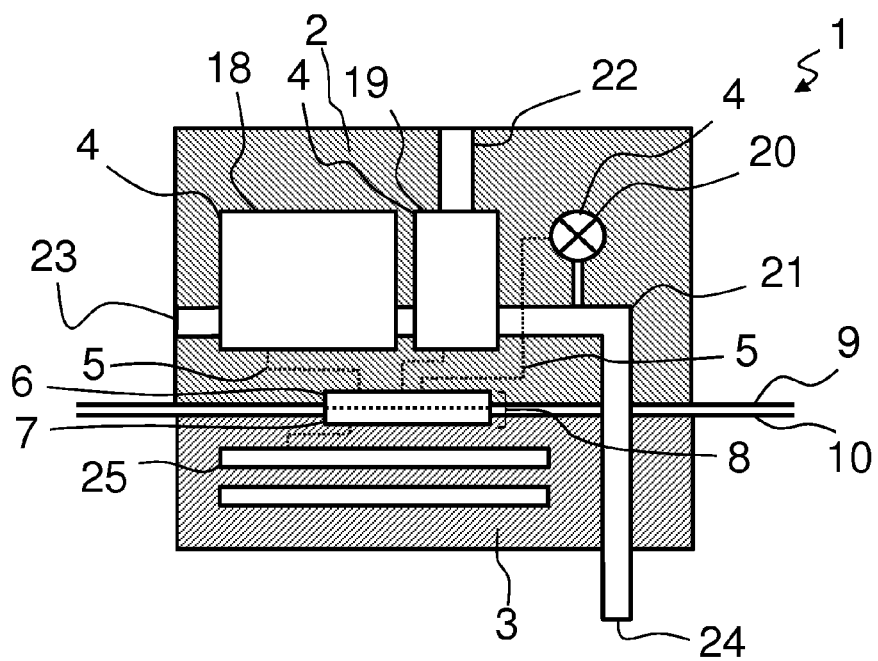
FIG. 1 is a diagrammatic, vertical-sectional view of an embodiment of a device as described herein.

Referring now in detail to the figures of the drawing for explaining the invention and the technical field in more detail by showing particularly preferred structural variants to which the invention is not restricted and in which illustrated proportions are diagrammatic, and first, particularly, to FIG. 1 thereof, there is seen a device 1 having an additive delivery unit 2 and an electronic unit 3. The additive delivery unit 2 has various hydraulic components 4. In this case, a pump 18, a valve 19 and a sensor 20 are provided as hydraulic components 4. The sensor 20 may, for example, be a temperature sensor through the use of which the temperature of the liquid additive can be measured. The sensor 20 may furthermore be a pressure sensor through the use of which a pressure of the liquid additive can be detected. It is also possible for the sensor 20 to be a quality sensor through the use of which a quality of the liquid additive can be measured. It is also possible for single or multiple sensors 20 to be provided which measure the quality, the pressure and/or the temperature of the liquid additive.

The various hydraulic components 4 in the additive delivery unit 2 are connected to one another through a delivery line 21. The liquid additive is delivered along the delivery line 21 from a suction point 23 to a supply connection 24. A line through which the delivered liquid additive can be conveyed onward to a feed device (not illustrated herein) may be connected to the supply connection 24.

The additive delivery unit illustrated in FIG. 1 also has a return line 22 which can be opened and closed by using the valve 19. A circulation of liquid additive from the suction point 23, through the pump 18 and back into a tank is also possible through the return line 22. Air bubbles can be conveyed out of the additive delivery unit 2 by using the circulation. The various hydraulic components 4 are connected through connections 5, illustrated by dashed lines, to a first plug connector 6.

The electronic unit 3 according to FIG. 1 has various electrical components 25 which are typically formed by semiconductor elements. The electronic components 25 are connected through connections 5 to a second plug connector 7. It is possible in this case for memory blocks, processors, arithmetic units, etc. to be provided as electrical components, which in particular control, monitor, regulate, etc. the operation of the hydraulic components.

The additive delivery unit 2 has a pot-shaped housing 9. The electronic unit 3 has a cover 10. The additive delivery unit 2 and the electronic unit 3 are mounted on one another in such a way that the first plug connector 6 and the second plug connector 7 form a plug connection 8. Furthermore, the cover 10 closes off the pot-shaped housing 9 in such a way that a dry interior space is formed in which the additive delivery unit 2 and the electronic unit 3 can be enclosed.

Figure 2:
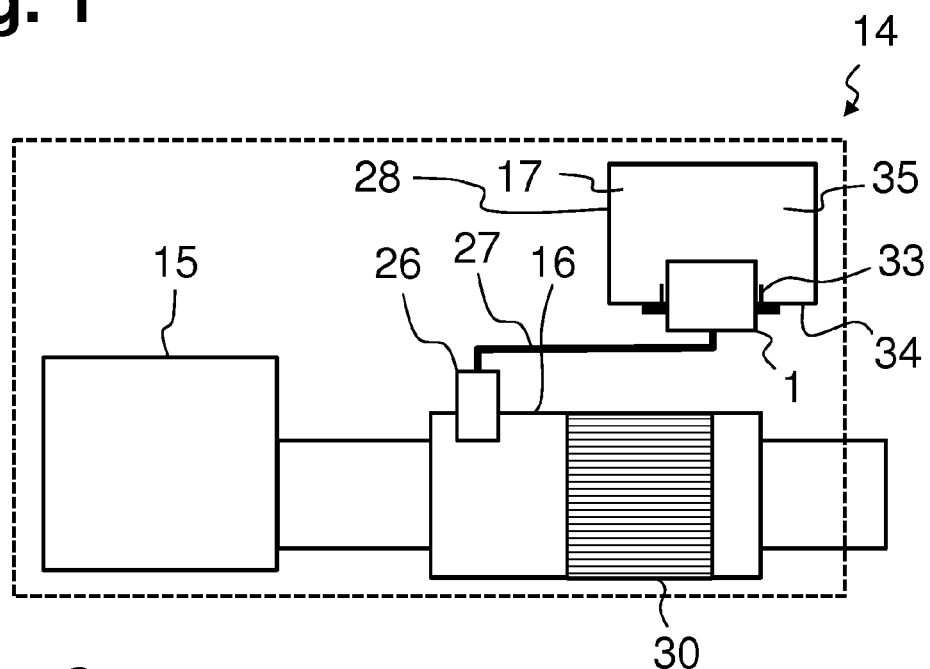
FIG. 2 is a block diagram of a motor vehicle having a device as described herein.

FIG. 2 shows a motor vehicle 14 having an internal combustion engine 15 and having an exhaust-gas treatment device 16 for the purification of the exhaust gases of the internal combustion engine 15. An SCR catalytic converter 30 provided in the exhaust-gas treatment device 16 can carry out the method of selective catalytic reduction. A liquid additive (preferably reducing agent and particularly preferably urea-water solution) can be fed into the exhaust-gas treatment device 16 by a feed device 26. For this purpose, liquid additive is supplied to the feed device 26 through a line 27 by a device 1. The liquid additive is stored in a tank 17 and can be extracted from the tank 17 by using the device 1.

The tank 17 has a tank wall 28. The device 1 is disposed in a tank base 34 of the tank 17. The figure shows that the device 1 is inserted into a tank opening 33 provided in the tank base 34. In a further structural variant, it is also possible for the tank base 34 to have a portion protruding inwardly into a tank interior 35 of the tank 17 and for the inwardly protruding portion to form a housing of the additive delivery unit 2 of the device 1.

FIGS. 3 to 6 show a preferred mode of operation of the first plug connector 6 and of the second plug connector 7 in a structural variant of the device 1. The figures show in each case the electronic unit 3 with the cover 10 and the additive delivery unit 2 with the housing 9. The first plug connector 6 is formed on the additive delivery unit 2. The second plug connection 7 is formed on the electronic unit 3. The first plug connector 6 is connected through movable connection lines 12 to the hydraulic components (not illustrated herein) in the additive delivery unit 2. The additive delivery unit 2 has a stop 11 which may preferably have a spring element 31 and which serves for realizing a firm connection of the first plug connection 6 and of the second plug connection 7. FIG. 3 shows the additive delivery unit 2 and the electronic unit 3 of the device 1 before assembly. During assembly, the spring element 31 exerts a defined force on the first plug connector 6, which force pushes the first plug connector 6 and the second plug connector 7 into one another.

In FIG. 4, the additive delivery unit 2 and the electronic unit 3 have been assembled on one another. The first plug connector 6 bears against the stop 11 and the second plug connector 7 is firmly connected to the first plug connector 6, so as to form the plug connection 8, during the assembly of the additive delivery unit 2 and electronic unit 3.

In FIG. 5, the additive delivery unit 2 and the electronic unit 3 have been released from one another during a disassembly process. The first plug connector 6 and the second plug connector 7 nevertheless remain connected to one another in the form of the plug connection 8. The first plug connector 6, which rested merely loosely on the stop 11 with the spring element 31, has moved away from the stop 11. The connection of the first plug connector 6 to the additive delivery unit 2 is, however, maintained through the connection lines 12.

In FIG. 6, the plug connection 8 has been released again. For this purpose, the plug connector 6 has a fastener 13. FIG. 6 illustrates that the plug connection 8 formed from the first plug connector 6 and the second plug connector 7 can be released when the fastener 13 is actuated. The fastener 13 is freely accessible when the electronic unit 3 has already been separated from the additive delivery unit 2.

Figure 7:
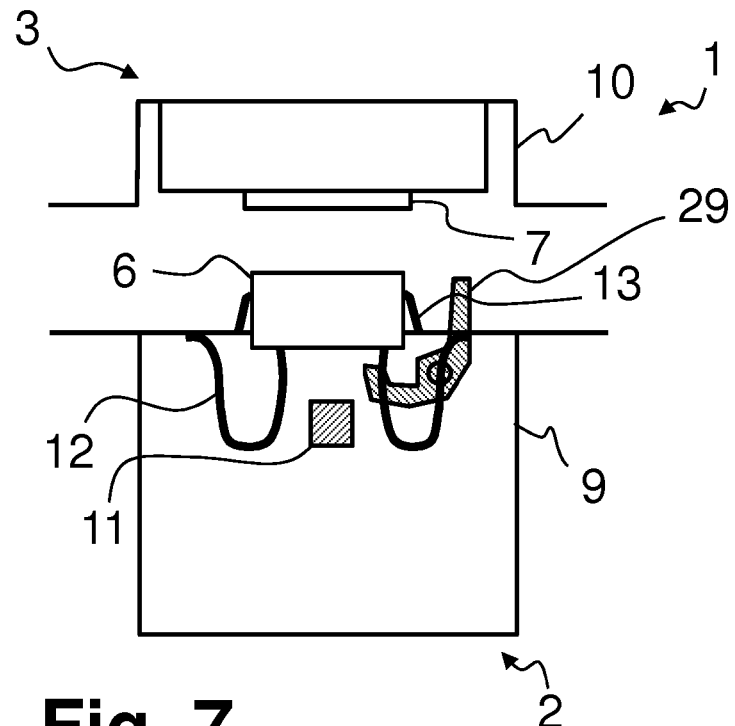
FIG. 7 is a fragmentary view of a second embodiment of a device as described herein.
Figure 8:
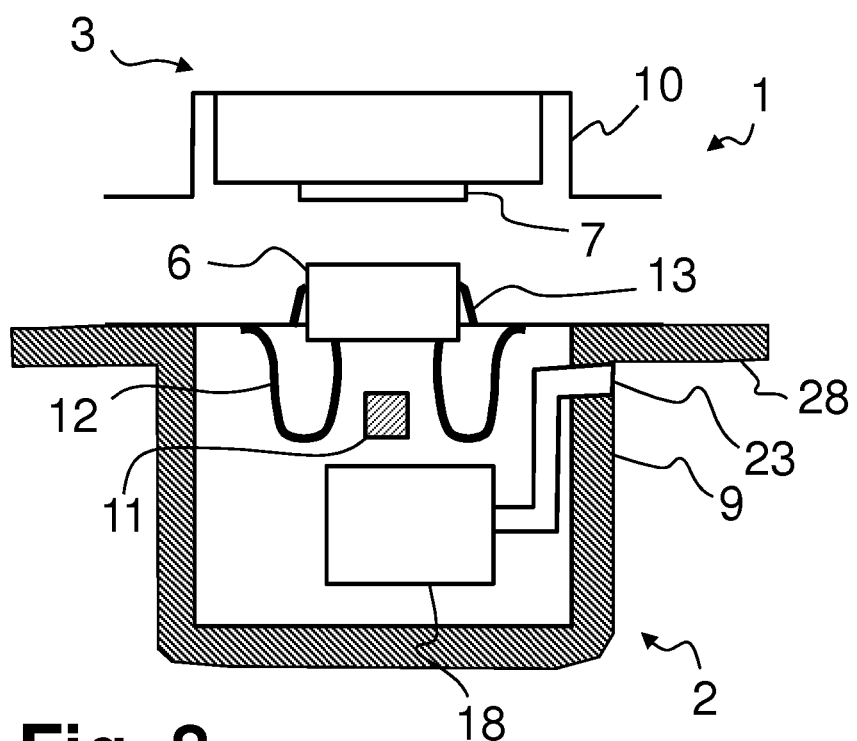
FIG. 8 is a fragmentary, partly-sectional view of a third embodiment of a device as described herein.
Figure 9:
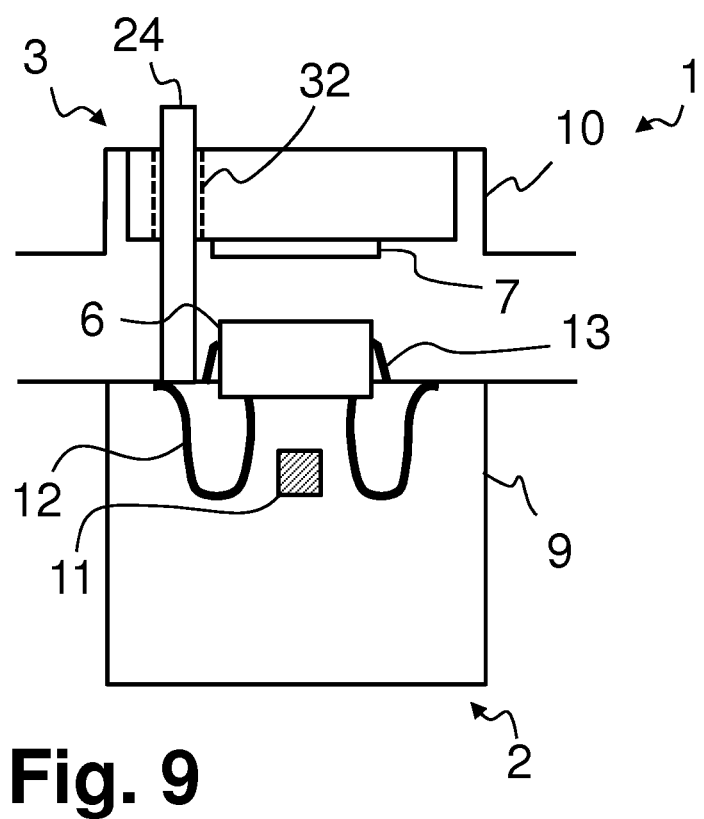
FIG. 9 is a fragmentary view of a fourth embodiment of a device as described herein.

FIGS. 7 to 9 show further embodiments of the device 1. The figures show in each case the same components as shown in FIG. 3. FIG. 7 additionally shows a prevention device 29 which can prevent the additive delivery unit 2 and the electronic unit 3 from being able to be connected to one another when the plug connection is not formed by the first plug connector 6 and the second plug connector 7. The prevention device 29 is in the form of a lever which is actuated when the plug connection between the first plug connector 6 and the second plug connector 7 is formed correctly. The lever must be actuated in order to permit the connection of the additive delivery unit 2 and the electronic unit 3 to take place. Otherwise, the lever prevents or at least hinders the assembly of the additive delivery unit 2 and the electronic unit 3.

FIG. 8 shows an embodiment of the device 1 in which the housing 9 of the additive delivery unit 2 is a constituent part of the tank wall 28 of a tank for the liquid additive. The tank or the portion of the tank wall 28 illustrated therein is preferably formed as an injection molded component. The housing 9 forms, in effect, an inwardly protruding portion in the tank wall 28, which inwardly protruding portion extends into an interior (not illustrated herein) of the tank. Also illustrated is a suction point 23 at which a pump 18 in the additive delivery unit 2 can extract the liquid additive directly from the tank.

FIG. 9 shows an embodiment of the device 1 in which the supply connection 24 extends through an opening 32 in the electronic unit 3.

Even though technical details have been explained herein in conjunction with a specific embodiment illustrated in the figures, this does not mean that the details can be realized only with all of the other features of the illustrated embodiments. Rather, it is the case that all of the technical details of different embodiments of the figures may be interchanged or supplemented, in particular where this is not ruled out from a technical aspect or reference has explicitly been made herein to the common use.

Through the use of the invention described herein, it is possible to produce a particularly low cost and advantageous device for delivering a liquid additive, in which electrical components of the device are clearly separated from hydraulic components of the device. This firstly permits fast assembly of the device. Ease of maintenance is simultaneously ensured.

The invention claimed is:

1. A device for delivering a liquid additive, the device comprising:
   an additive delivery unit having at least one hydraulic component for delivering the liquid additive, said at least one hydraulic component having electrical connections, and said additive delivery unit having a first plug connector bringing together all of said electrical connections;
   an electronic unit having a second plug connector configured to be connected to said first plug connector; and
   said first plug connector and said second plug connector being disposed and constructed for forming a plug connection when said electronic unit is brought into contact with said additive delivery unit and for maintaining the plug connection upon said electronic unit being separated from said additive unit.

2. The device according to claim 1, wherein said additive delivery unit has a pot-shaped housing and said electronic unit has a cover for said pot-shaped housing, said pot-shaped housing being closed by said cover when said electronic unit and said additive delivery unit are connected to one another.

3. The device according to claim 2, wherein said pot-shaped housing is part of a tank wall of a tank for the liquid additive.

4. A device for delivering a liquid additive, the device comprising:
   an additive delivery unit having at least one hydraulic component for delivering the liquid additive, said at least one hydraulic component having electrical connections, and said additive delivery unit having a first plug connector bringing together all of said electrical connections;
   an electronic unit having a second plug connector configured to be connected to said first plug connector; and
   said first plug connector and said second plug connector being interconnected and forming a plug connection upon an interconnection of said electronic unit and said additive delivery unit; a stop against which at least one of said first plug connector or said second plug connector bears when said electronic unit and said additive delivery unit are interconnected, and said first plug connector and said second plug connector are pressed into one another by said stop during said interconnection of said first plug connector and said second plug connector.

5. A device for delivering a liquid additive, the device comprising:
   an additive delivery unit having at least one hydraulic component for delivering the liquid additive, said at least one hydraulic component having electrical connections, and said additive delivery unit having a first plug connector bringing together all of said electrical connections;
   an electronic unit having a second plug connector configured to be connected to said first plug connector; and
   said first plug connector and said second plug connector being interconnected and forming a plug connection upon an interconnection of said electronic unit and said additive delivery unit, at least one of said first plug connector or said second plug connector having a movable electrical connection line maintaining a connection of said first plug connector or said second plug connector upon releasing said electronic unit and said additive delivery unit from one another.

6. The device according to claim 1, wherein at least one of said first plug connector or said second plug connector has a fastener being activatable to release said plug connection.

7. The device according to claim 1, which further comprises a supply connection for the liquid additive, said supply connection extending from said additive delivery unit through said electronic unit.

8. The device according to claim 1, which further comprises a prevention device disposed on at least one of said additive delivery unit or said electronic unit, said prevention device preventing said electronic unit and said additive delivery unit from being interconnected when said plug connection is not formed by said first plug connector and said second plug connector.

9. A motor vehicle, comprising:
   an internal combustion engine;
   an exhaust-gas treatment device for purification of exhaust gases of said internal combustion engine;
   a tank for a liquid additive; and
   a device according to claim 1 for delivering liquid additive from said tank into said exhaust-gas treatment device.

* * * * *